United States Patent
McCarty et al.

(10) Patent No.: US 6,919,559 B2
(45) Date of Patent: Jul. 19, 2005

(54) HIGH-TEMPERATURE OPTICAL ROTARY AND LINEAR POSITION SENSOR

(75) Inventors: Robert S. McCarty, Parks, AZ (US); Joe Shiefman, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 67 days.

(21) Appl. No.: 10/262,766

(22) Filed: Oct. 1, 2002

(65) Prior Publication Data

US 2004/0061045 A1 Apr. 1, 2004

(51) Int. Cl.[7] ................. B01J 1/04; B01J 1/42
(52) U.S. Cl. ............... 250/231.13; 250/231.14; 356/614
(58) Field of Search .............. 250/231.1, 231.13, 250/231.14, 231.18, 227.11; 356/614

(56) References Cited

U.S. PATENT DOCUMENTS

| | | |
|---|---|---|
| 3,574,466 A | 4/1971 | Peters |
| 3,697,183 A | 10/1972 | Knight |
| 5,038,031 A | 8/1991 | Kurosawa |
| 5,045,691 A | 9/1991 | Steward |
| 5,103,090 A | 4/1992 | Weiner |
| 5,247,173 A | 9/1993 | Benchetrit |
| 5,266,796 A | 11/1993 | Leviton |
| 5,329,121 A | 7/1994 | Leviton |
| 5,483,058 A | 1/1996 | Leviton |
| 5,983,720 A * | 11/1999 | Crabb et al. ............. 73/514.26 |
| 6,031,222 A | 2/2000 | Carapelli |
| 6,532,678 B2 * | 3/2003 | Morgan ..................... 33/530 |
| 6,639,207 B2 * | 10/2003 | Yamamoto et al. ..... 250/231.14 |

FOREIGN PATENT DOCUMENTS

| | | |
|---|---|---|
| DD | 234 727 A | 4/1986 |
| DE | 31 05 788 A | 12/1981 |
| DE | 39 24 460 A | 2/1990 |
| DE | 39 39 905 A | 6/1991 |

* cited by examiner

Primary Examiner—Stephone B. Allen
Assistant Examiner—Patrick J. Lee
(74) Attorney, Agent, or Firm—Robert Desmond, Esq.

(57) ABSTRACT

A device and method capable of measuring the optical rotary and linear position of items, that is reliable, accurate and capable of operating in harsh environments. The present invention utilizes optics to measure rotary and linear position. Unlike the prior art the present invention relies on the optical angle to determine position rather than an analog signal or intensity. Because of this, the present invention is capable of providing accurate results in high temperature, harsh and dirty environments. Further, the present invention reduces the need for time consuming and costly replacements at the sensing end.

21 Claims, 1 Drawing Sheet

$$y = z \sin\theta$$
$$\Delta y = 2z \sin\theta$$
$$\delta y = 2\delta z \sin\theta$$

US 6,919,559 B2

HIGH-TEMPERATURE OPTICAL ROTARY AND LINEAR POSITION SENSOR

BACKGROUND OF THE INVENTION

The present invention generally relates to devices that measure the location of a rotatable member. More particularly, the present invention provides a device and method, capable of measuring the optical rotary and linear position of items, and that is reliable, accurate, immune to EMI and capable of operating in harsh environments.

Many scientific, industrial, military and aerospace applications require precise and accurate knowledge of the angular orientation of a shaft or other rotating object or the linear position of a reciprocating object. This is a task often complicated by high temperatures, magnetic interference and vibration. A variety of rotation sensors are currently available in the art for sensing or measuring relative rotation of a rotatable member. These devices generally record very small angular changes and keep track of accumulated change relative to some reference angle. In these encoders the angular information generally is lost if this reference angle becomes corrupted. This may occur for a number of reasons such as power interruption or magnetic interference. Also, some of these encoders achieve additional sensitivity by means of gear trains which are subject to hysteresis which limit accuracy and make angular determination indirect. Another problem with devices that rely on low level electrical signals to determine the distance and/or angular displacement between two parts is inability to deliver accurate reading at elevated temperature such as between 500° F. and 1000° F.

Another type of rotation sensor is an optical encoder. In such a rotation sensor, a matched light source and a photodetector are provided on the opposite sides of a disk. The disk is attached to a shaft which is in turn mechanically coupled to the device whose rotation is to be measured. The disk is provided with a plurality of apertures which vary in radial position as the disk rotates, enabling light to pass through only at certain radii corresponding to its degree of rotation. Optical encoders are commonly available to provide absolute or incremental angle measurement. Although optical encoder rotation sensors function satisfactorily for certain applications, their use in many applications is limited because of size and weight limitations. They are also sensitive to electromagnetic interference (EMI).

U.S. Pat. No. 5,329,121 issued to Leviton describes an optical encoder. The inventor discloses a device for positioning encoding of a rotating shaft in which a polygonal mirror having a number of facets is mounted to the shaft and a light beam is directed towards the facets. The facets of the polygonal mirror reflect the light beam such that a light spot is created on a linear array detector. An analog-to-digital converter is connected to the linear array detector for reading the position of the spot on the spots on the linear array detector. A microprocessor with memory is connected to the analog-to-digital converter to hold and manipulate the data provided by the analog-to-digital converter on the position of the spot and to compute the position of the shaft based upon the data from the analog-to-digital converter. This device has significant disadvantages in high temperature operations such as jet engines and gas turbines in that the measuring device may be dirtied. For apparatus that rely on intensity or analog measurements this can cause great difficulty. Dirt and debris can significantly interfere with the measurements and the equipment. This can lead to misinformation. Further, contamination at the sensing end and connectors must be cleaned and/or replaced in the field. This is time consuming, costly, and overly difficult.

Rotation sensors utilizing electrical resolver technology continue to be used in some aircraft applications. Electrical resolvers rely on mutual induction of electrical coils to convey the rotational position. Rotation sensors using this technology are generally quite massive, are usually less accurate and more expensive than sensors using optical encoders, and are also sensitive to EMI.

Resistive potentiometers are also used in some rotation sensors. The principal limitation of this type of rotation sensor is the limited number of cycles per lifetime, particularly with small sensors. Further, the output of the potentiometer, in most applications, requires shielding. Although normally smaller in size than an optical encoder sensors, they are often less desirable for small volume, critical applications because of unreliability and reduced precision. A further major drawback to potentiometer based sensors, like the others described above, is that the signal is conveyed via a wire; therefore, they are not immune to electromagnetic interference (EMI).

Hall effect rotation sensors involving the rotation or movement of a magnet past a detector are also available. However, they likewise suffer from the limitation of not being immune to EMI.

As can be seen, there is a need for a device and method capable of measuring the optical rotary and linear position of items that is reliable, accurate, immune to EMI and capable of operating in harsh environments.

SUMMARY OF THE INVENTION

In one aspect of the present invention, a rotating position sensor is disclosed, comprising a first member carrying at least one source of light, a second member rotatable about an axis of rotation relative to the sources of light, a light reflecting surface fixedly attached to the second member, and a light reflecting surface comprising a surface portion offset relative to the axis of rotation. There may be at least one reflected light receiving member fixed relative to the source or sources of light. The sources of light, light reflecting surfaces, and at least one reflected light receiving member are positioned relative to one another whereby light from the source of light is reflected from the light reflective surface and received by at least one reflected light receiving member. The optical angle of the reflected light received by the at least one reflected light receiving member varies with the orientation of the first member relative to the second member. This optical angle may be utilized to determine the position of the first member relative to the second member.

According to another aspect of the present invention, a linear position sensor is disclosed comprising a first member carrying at least one source of light, a second member which linearly translates along an axis relative to the sources of light, a light reflecting surface may be attached to the second member, and the light reflecting surface may comprise a surface portion relative to the axis. There may be at least one reflected light receiving member having a light receiving surface fixed relative to the source of light. The source of light, light reflecting surface, and at least one reflected light receiving member being positioned relative to one another whereby light from at least one source of light may be reflected from the light reflective surface and received by the at least one reflected light receiving member. The optical angle of the reflected light received by at least one reflected light receiving member varies with the orientation of said first member relative to said second member. From this optical angle the position of the first and/or second member may be determined.

According to another embodiment of the present invention, a position sensor for use in an environment with a temperature between 500 and 1500 degrees Fahrenheit is disclosed comprising: a first member with one source of light and at least one reflected light receiving member mounted to the first member; a second member which linearly translates along an axis relative to at least one source of light; a light reflecting surface attached to the second member, this light reflecting surface comprising a surface portion relative to the axis; and a plurality of reflected light receiving members having a light receiving surface fixed relative to at least one source of light. The plurality of reflected light receiving members may be a linear array of optic fibers and the optic fibers may be connected to an array of LED's. The at least one source of light, light reflecting surface, and at least one reflected light receiving member are positioned relative to one another whereby light from at least one source of light is reflected from the light reflective surface and received by at least one reflected light receiving member and the optical angle of the reflected light received by at least one reflected light receiving member varies with the orientation of the first member relative to the second member.

According to yet another embodiment of the present invention, a method of sensing the position of a first member relative to a second member is disclosed. This method may comprise the steps of providing a source of light on the first member, providing a light reflecting surface on the surface portion of the second member, providing a light receiving surface with a plurality of light receiving members on the first member. The source of light, reflective surface and plurality of light receiving members may be positioned relative to one another such that light from said light source is reflected off the reflective surface and received by the plurality of light receiving members such that the optical angle of the reflected light is unique for each position between the first and second members. The light source may be activated, directing light from the light source to the reflective surface. The reflective surface may then be moved such as to direct light to at least one of the plurality of light receiving members. The optical angle reflected off the reflective surface and received by a plurality of light receiving members may be measured. The relative position of the members may be determined from information regarding the optical angle of the reflected light and which of the plurality of light receiving members received this light.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a means to measure the position, both rotary and linear, of at least one member. It is an object of the present invention to be utilized at high temperatures without any effect on the accuracy of readings. By way of example, the present invention may be particularly well suited for aerospace applications, such as jet engine bleed air valves. The present invention differs from the prior art in that it provides a rotating and linear position sensor that utilizes a multitude of light receiving members and geometry to determine the position of a second member relative to a first member. As such, optics are utilized to determine the position of members. This is particularly useful in high temperature and dirty environments where sensors that rely upon analog or intensity measurements have serious disadvantages.

Figure 1:
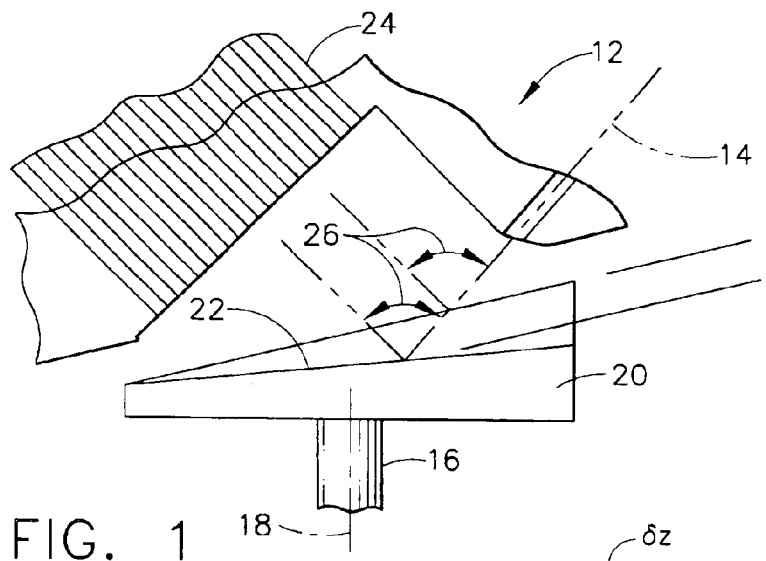
FIG. 1 is a side view of the present invention according to one embodiment.

FIG. 1 depicts an embodiment according to one aspect of the present invention. As shown a rotating position sensor is disclosed with a first member 12 carrying one source of light 14, which may be a laser. A second member 16 rotates about an axis of rotation 18 relative to the source of light 14. A light reflecting surface 20 may be fixedly attached to the second member 16. It should be understood that the second member 16 may be offset to the axis of rotation 18, therefore the reflected angle continuously changes for 360 degrees and then repeats. The light reflecting surface 20 may have a surface portion 22 relative to the axis of rotation 18. There may be at least one reflected light receiving member 24 fixed relative to the source or sources of light 14. The reflected light receiving member may be a fiber optic or any receptor fiber known within the art. The source of light 14, light reflecting surfaces 20 and at least one reflected light receiving member 24 may be positioned relative to one another whereby light from the source of light 14 may be reflected from the light reflective surface 20 and received by at least one reflected light receiving member 24. The optical angle 26 of the reflected light received by the reflected light receiving member 24 may vary with the orientation of the first member 12 relative to the second member 16. This optical angle 26 may be utilized to determine the position of the first member 12 relative to the second member 16.

In accordance with another aspect of the present invention, a linear position sensor is disclosed as in FIG. 1 comprising a first member carrying at least one source of light 14, a second member which linearly translates relative to the source of light 14, a light reflecting surface 22 may be attached to a second member 16 and the light reflecting surface 20 may comprise a surface portion 22. There may be at least one reflected light receiving member 24 having a light receiving surface 20 fixed relative to the source of light 14. The source of light 14, light reflecting surface 20 and at least one reflected light receiving member 24 are positioned relative to one another whereby light 14 from a source of light may be reflected from the light reflective surface 20 and received by the at least one reflected light receiving member 24. The optical angle 26 of the reflected light received by the reflected light receiving member 24 may vary with the orientation of the first member 12 relative to the second member 16. From this optical angle the position of the first and/or second member may be determined.

Figure 2:
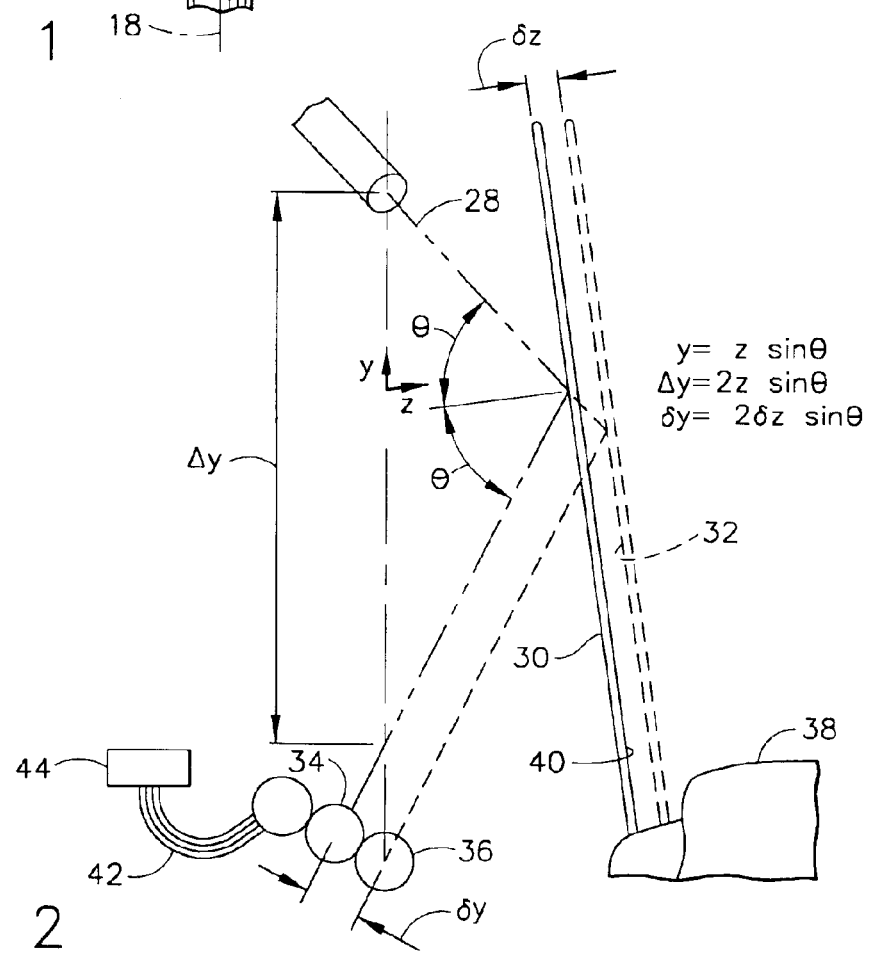
FIG. 2 is a side view of the present invention according to one embodiment.

According to another embodiment, as shown in FIG. 2, a position sensor for use in an environment with a temperature between 500 and 1500 degrees Fahrenheit is disclosed comprising a first member with one source of light 28 and at least one reflected light receiving member 34. A reflective surface 30 which is attached to a second member may linearly translate relative to a plurality of reflected light receiving members 34, 36. A light receiving surface 30 is fixed relative to a light 28. The plurality of reflected light receiving members 34 may be a linear array of optic fibers 42 and the optic fibers 42 may be connected to an array of LED's 44. The source of light 28, light reflecting surface 30 and light receiving members 34, 36 are positioned relative to one another whereby light from the source of light 28 is reflected from the light reflective surface 30 and received by a reflected light receiving member 34 and the optical angle of the reflected light received by the reflected light receiving member 34 varies with the orientation of the first member relative to the second member. By way of example, a laser may be used to shine light on the reflecting surface, which moves linearly. Depending on which light receiving member receives the light, an angle can be determined, which in turn helps to determine the distance of a first member from a second member.

According to another embodiment, a method of sensing the position of a first member relative to a second member is disclosed. This method may comprise the steps of providing a source of light and plurality of light receiving members on a first member and providing a light reflecting surface on the surface portion of a second member. The source of light, reflective surface and plurality of light receiving members are positioned relative to one another such that light is reflected off the reflective surface and received by at least one of the plurality of light receiving members. The optical angle of the reflected light is unique for each position between the first and second members. The light source may be activated, the optical angle may be reflected off the reflective surface and received by at least one of a plurality of light receiving members. The relative position of the members may be determined from the optical angle of the reflected light. This information includes which of the light receiving members received the light. By way of example, a laser may direct light 28 on a reflective surface 30, the surface may be moved in relation to the laser to provide a shifted reflective surface 32. This may be in many ways, such as rotating, linearly translating, etc. As the light from the laser is moved, the particular light receiving member which receives the light changes. By determining which light receiving member receives the light, the angle Θ can be determined, which in turn allows the position of the first member relative to the second member to be determined.

FIG. 2 depicts the manner in which the change in distance may be calculated. As shown, light 28 which may be from a laser device or apparatus attached to a first member 12 may be directed to a reflective surface 30, which is attached to a second member 16, and received by a light receiving member 34. The second member 16 may then move, and the reflective surface 30 may also move as depicted by the shifted reflective surface 32. As such, the second light receiving member 36 receives light 28 from the laser. Geometry may be used to calculate the distance between the first member and the second member and the changes is distance as the sensor is operated. As shown in the diagram there are three equations that describe the geometry of interest.

The first equation:

$$y = z\sin\theta \quad (1)$$

indicates that the y displacement is a function of the angle of incidence (relative to the normal to the reflective surface 32 ) and the distance from the reflective surface 32 and the plane of member 12.

The second equation describes the displacement of the return beam relative to the start beam:

$$\Delta y = 2z\sin\theta \quad (2)$$

The factor of 2 that appears in the second equation (2) but not in the first equation (1) is due to the doubling of the y displacement in the round trip.

The third equation is:

$$\delta y = 2\delta z \sin\theta \quad (3)$$

This describes the change in the y displacement (δy) on return to plane for a given change in the z position (δz) of the reflective surface 32. The change in the z position of the blade (δz) is of interest and measures the change in the y displacement (δy) on return to the plane of member 12. Therefore, it is useful to rewrite equation (3) as the following:

$$\delta z = \frac{\delta y}{2\sin\theta} \quad (4)$$

This reflects the magnitude of the z position change for a given y displacement. The geometric relationships given above are an example for a particular configuration of light source, reflecting surface and receiving optic fibers. Other alignments or configurations are possible within the spirit of this invention that would result in different geometric equations.

The system is a digital methodology. The reflected light is directed towards a linear array of optic fibers set at an angle to the second. The light source and light receiving optics may be mounted in the compressor or turbine shroud of an engine 38 and the reflective surface may be a rotating blade 40 of said engine. The distance between the first member and the second member is determined by the geometry of the system and the knowledge of which fiber optic is illuminated. The fibers may be, by way of example, those as produced by Fiberguide Industries. They are silica core and clad with a gold jacket, having a core diameter of 50 microns and a total diameter of 155 microns. They may be hermetically sealed and designed to handle height temperatures and high stress environments. The light may be a laser, such as that produced by Blue Sky Research, model PM633. Because the present invention utilizes digital information, it is capable of being utilized at high temperatures in the range of 500 to 1500 degrees Fahrenheit without the need for cleanliness associated with analog or intensity measurements.

It should be understood, of course, that the foregoing relates to preferred embodiments of the invention and that modifications may be made without departing from the spirit and scope of the invention as set forth in the following claims.

We claim:

1. A rotating position sensor comprising:
   a first member carrying at least one source of light;
   a second member rotatable about an axis of rotation relative to said at least one source of light;
   a light reflecting surface fixedly attached to said second member, said light reflecting surface comprising a surface portion offset relative to said axis of rotation;
   at least one reflected light receiving member fixed relative to said at least one source of light;
   said first member and said second member are positioned relative to one another such that said axis of rotation intersects a portion of said at least one reflected light receiving member; and
   said at least one source of light, said light reflecting surface and said at least one reflected light receiving member being positioned relative to one another whereby a position of said second member varies according to a movement of said light reflecting surface of said second member from a first z position to a second z position in relation to a total distance traveled by said reflected light and a displacement of said reflected light relative to said movement of said second member from said first z position to said second z position.

2. The rotating position sensor of claim 1, wherein said sensor is utilized in an environment with a temperature between 500 and 1500 degrees Fahrenheit.

3. The rotating position sensor of claim 1, wherein said at least one source of light and said at least one reflected light receiving member are mounted to said first member.

4. The rotating position sensor of claim 1, wherein said at least one source of light comprises a plurality of sources of light spaced from one another.

5. The rotation sensor of claim 1, wherein said at least one reflected light receiving member is a linear array of optic fibers.

6. The rotation sensor of claim 5, wherein said optic fibers are connected to an array of LED's.

7. The rotation sensor of claim 1, wherein said at least one source of light are sequentially pulsed.

8. A linear position sensor comprising:
a first member carrying at least one source of light;
a second member which linearly translates along an axis relative to said at least one source of light;
a light reflecting surface attached to said second member, said light reflecting surface comprising a surface portion relative to said axis;
at least one reflected light receiving member having a light receiving surface fixed relative to said at least one source of light;
said first member and said second member are positioned relative to one another such that said axis intersects a portion of said reflected light receiving members; and
said at least one source of light, said light reflecting surface and said at least one reflected light receiving member being positioned relative to one another whereby a position of said second member varies according to a movement of said light reflecting surface of said second member from a first z position to a second z position in relation to a total distance traveled by said reflected light and a displacement of said reflected light relative to said movement of said second member from said first z position to said second z position.

9. The linear position sensor of claim 8, wherein said sensor is utilized in an environment with a temperature between 500 and 1500 degrees Fahrenheit.

10. The linear position sensor of claim 8, wherein said at least one source of light and said at least one reflected light receiving member are mounted to said first member.

11. The linear position sensor of claim 8, wherein said at least one source of light comprises a plurality of sources of light spaced from one another.

12. The linear position sensor of claim 1, wherein said at least one reflected light receiving member is a linear array of optic fibers.

13. The linear position sensor of claim 12, wherein said optic fibers are connected to an array of LED's.

14. The linear position sensor of claim 12, wherein said at least one source of light are sequentially pulsed.

15. A position sensor for use in an environment with a temperature between 500 and 1500 degrees Fahrenheit, comprising:

a first member with one source of light and at least one reflected light receiving member mounted to said first member;
a second member which linearly translates along an axis relative to said at least one source of light;
a light reflecting surface attached to said second member, said light reflecting surface comprising a surface portion relative to said axis;
a plurality of reflected light receiving members having a light receiving surface fixed -relative to said at least one source of light, wherein said plurality of reflected light receiving members are a linear array of optic fibers and said optic fibers are connected to an array of LED's;
wherein said first member and said second member are positioned relative to one another such that said axis intersects a portion of said plurality of reflected light receiving members; and
wherein said at least one source of light, said light reflecting surface and said at least one reflected light receiving member being positioned relative to one another whereby a position of said second member varies according to a movement of said light reflecting surface of said second member from a first z position to a second z position in relation to a total distance traveled by said reflected light and a displacement of said reflected light relative to said movement of said second member from said first z position to said second z position.

16. A position sensor for use in a gas turbine engine with a temperature between 500 and 1500 degrees Fahrenheit, comprising:
a gas turbine engine with one source of light and at least one reflected light receiving member mounted to said gas turbine engine;
a blade member which rotates around an axis relative to said at least one source of light;
a light reflecting surface attached to said blade member, said light reflecting surface comprising a surface portion relative to said axis;
a plurality of reflected light receiving members having a light receiving surface fixed relative to said at least one source of light, wherein said plurality of reflected light receiving members are a linear array of optic fibers and said optic fibers are connected to an array of LED's;
said gas turbine engine and said blade member are positioned relative to one another such that said axis intersects a portion of said plurality of reflected light receiving members; and
said at least one source of light, said light reflecting surface and said at least one reflected light receiving member being positioned relative to one another whereby a position of said blade member varies according to a movement of said light reflecting surface of said blade member from a first z position to a second z position in relation to a total distance traveled by said reflected light and a displacement of said reflected light relative to said movement of said blade member from said first z position to said second z position.

17. A method of sensing the position of a first member relative to a second member in which said second member includes a surface portion, said method comprising the steps of:
providing a source of light on said first member;
providing a light reflecting surface on said surface portion of said second member, said second member having an axis of rotation relative to said source of light;

providing a light receiving surface with a plurality of light receiving members on said first member;

said source of light, said reflective surface and said plurality of light receiving members being positioned relative to one another such that light from said light source is reflected off said reflective surface and received by one of said plurality of light receiving members such that the optical angle of said reflected light is unique for each position between said first and second members;

activating said light source;

directing light from said light source to said reflective surface, moving said reflective surface, such as to direct light to one of said plurality of light receiving members, wherein said first member and said second member are positioned relative to one another such that said axis of rotation intersects a portion of said plurality of light receiving members;

measuring the optical angle of said reflected light which is reflected off said reflective surface and received by said plurality of light receiving members; and determining the relative position of said members from information regarding the optical angle of said reflected light according to the equation:

$$\delta z = \frac{\delta y}{2\sin\theta}$$

wherein $\delta z$ represents a measurement of a movement of said light reflecting surface of said second member from a first z position to a second z position; $\delta y$ represents a measurement of a displacement of said reflected light relative to said movement of said second member from said first z position to said second z position; and, 2s in $\theta$ represents a measurement of a total distance traveled by said reflected light.

18. The method as in claim 17, wherein said sensor is utilized in an environment with a temperature between 500 and 1500 degrees Fahrenheit.

19. The method as in claim 17, wherein the step of determining the relative position of said members is accomplished in a separate environment.

20. The method as in claim 17, wherein said at plurality of light receiving members are a linear array of optic fibers.

21. The method as in claim 17, wherein said optic fibers are connected to an array of LED's.

* * * * *

UNITED STATES PATENT AND TRADEMARK OFFICE
CERTIFICATE OF CORRECTION

PATENT NO. : 6,919,559 B2 Page 1 of 1
APPLICATION NO. : 10/262766
DATED : July 19, 2005
INVENTOR(S) : McCarty et al.

It is certified that error appears in the above-identified patent and that said Letters Patent is hereby corrected as shown below:

Column 8, line 10, "fixed -relative" should be changed to --fixed relative--;

Column 10, line 10, "2s in $\theta$" should be changed to --2sin $\theta$--.

Signed and Sealed this

Twenty-seventh Day of March, 2007

JON W. DUDAS
*Director of the United States Patent and Trademark Office*